Oct. 7, 1969 G. E. CLOCK 3,471,317
PROCESS FOR COATING GLASS ELECTRONIC VACUUM TUBES
Filed Aug. 25, 1965
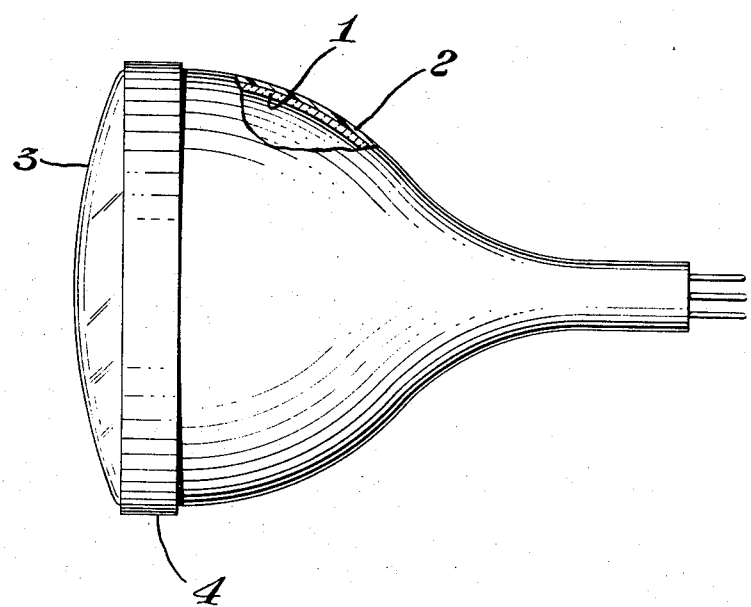
INVENTOR.
Gerald E. Clock
BY
ATTORNEY 3,471,317
PROCESS FOR COATING GLASS ELECTRONIC
VACUUM TUBES
Gerald E. Clock, Midland, Mich., assignor to The Dow
Chemical Company, Midland, Mich., a corporation of
Delaware
Filed Aug. 25, 1965, Ser. No. 482,633
Int. Cl. C03c 17/32
U.S. Cl. 117—94                                    5 Claims

ABSTRACT OF THE DISCLOSURE

A television picture tube having intimately adhered to the back portion thereof a thin polymeric coating comprising a copolymer of ethylene and an $\alpha,\beta$-ethylenically unsaturated carboxylic acid such as acrylic acid and a process for applying the coating to said tube wherein the tube is heated prior to the coating application and after the coating is applied.

---

This invention relates to shatter proof coatings for glass electronic vacuum tubes and more particularly it relates to coating television picture tubes with an adhesive polymer coating.

Various methods have been employed to prevent the shattering of glass electronic vacuum tubes and thereby avoiding the hazard of flying pieces of glass. For example, television picture tubes have been surrounded or coated with films of polyethylene terephthalate in an attempt to provide a shatter proof picture tube. The above process is accomplished by means such as heating polyethylene terephthalate film to a temperature slightly below the crystalline melting point of the film, draping it over a television tube and stretching and heating the film in appropriate places to conform the film to the shape of the tube. The film is then cooled while tension is applied.

In accordance with the present invention, it has now been found that protective thermoplastic coatings can be applied to glass electronic vacuum tubes such as television tubes, for example, by heating a tube to a temperature of at least 150° C. and applying to the outside surface thereof an adhesive layer of a copolymer of ethylene and an ethylenically unsaturated carboxylic acid. In television picture tubes, the front or face portion of the tube is free of the coating composition. The coated tube is subjected to heat of about 200° C. to effect an adhesive bond between the polymer and the external glass surface of the tube. A compression band is secured tightly around the weld line behind the face of the tube to reduce the hazard of flying glass from the face portion of the tube.

The figure of the accompanying drawing illustrates one embodiment of the present invention. The back portion of a television picture tube 1 is coated with a thin layer 2 of a copolymer of ethylene and an ethylenically unsaturated carboxylic acid. A compression band 4 is securely tightened around the weld line between the face of the tube 3 and the back portion of the tube 1.

Upon implosion of an uncoated television picture tube, the face is suddenly forced against the back of the tube shattering the entire structure. The particular tube of the present invention substantially overcomes the above problem since the back portion of the tube is adhesively bonded to the coating composition. Upon implosion, the face strikes the back portion of the tube breaking the glass, however, the polymer-glass laminate retains the glass pieces in place. As is practiced in the art, a heavy compression band is securely tightened around the "weld line" of the tube to decrease the force with which the face ruptures when breakage occurs.

The polymer compositions that are employed in coating glass electronic vacuum tubes of the present invention are copolymers comprising a major portion of ethylene and from about 2 to about 20 percent by weight based on the copolymer of an acidic comonomer selected from $\alpha,\beta$-ethylenically unsaturated mono- and polycarboxylic acids and acid anhydrides having from 3 to 8 carbon atoms per molecule and partial esters of such polycarboxylic acids wherein the acid moiety has at least one carboxyl group and the alcohol moiety has from 1 to 20 carbon atoms. Specific examples of such acidic comonomers are acrylic acid, methacrylic acid, crotonic acid, fumaric acid, maleic acid, itaconic acid, maleic anhydride, monomethyl maleate, monoethyl maleate, monomethyl fumarate, and monoethyl fumarate. The copolymers can be prepared by methods known to the art, for example, by polymerizing mixtures of ethylene and one or more of the specified acid comonomers at a pressure between 1,000 and 3,000 atmospheres and at temperatures from about 90° C. to 300° C. in the presence of peroxy catalysts.

Graft copolymers such as a copolymer of polyethylene and acrylic acid may also be employed as the coating composition in the invention. Such copolymers may be prepared by known methods such as reacting unsaturated carboxylic acids with a normally solid homopolymer of an olefin such as ethylene at temperatures from about 65° C. to about 170° C. and at atmospheric, subatmospheric or superatmospheric pressure.

The copolymer coating may be applied to an electronic tube by various methods such as by means of a fluidized bed, powder spray, electrostatic powder spray, flame spraying or applying the copolymer in the form of a dispersion or emulsion. Where a more adherent and moisture-resistant bond is desired, the glass surface is treated with an adhesion promoter such as polyethylenimine. The copolymer coating should be present on the surface of the tube in a thickness of from about 5 to about 30 mils and preferably from about 15 to about 25 mils.

In applying the polymer coating, it is desirable to preheat the tube to a temperature of at least 150° C. The polymer coating composition is then applied and the resulting construction heated to at least 150° C. to promote the adhesive bond between the polymer and glass surface.

Fibrous fillers and reinforcing materials may be added to the copolymer to provide a stronger protective layer. Examples of fillers and reinforcing materials include glass, nylon, cotton, rayon and the like.

As an example of the invention, an evacuated 23-inch television picture tube is heated to a temperature of 200° C. The back outside of the tube is spray-coated with a dry powder of a copolymer of ethylene and acrylic acid (8 percent acrylic acid, melt index 5, 50 mesh). The copolymer is evenly applied until a thickness of about 20–25 mils is obtained. The coated tube is post-heated at a temperature of about 200° C. for a period of 5 minutes to complete the flow and fusion of the powdered copolymer. A metal band is securely tightened around the weld line of the tube.

The coated tube is cooled to room temperature and imploded by striking the uncoated tube face with a ½ lb. steel ball. Glass pieces of the face are propelled toward the back of the tube, breaking the glass of the back portion of the tube. However, the glass pieces of the face fail to penetrate the copolymer coating even though the glass itself is broken.

What is claimed is:

1. A process for producing a television picture tube having an external glass surface and having adhered to the outside back portion thereof a thin polymeric coating capable of retaining in place glass fragments of the tube resulting from implosion of the tube, said process comprising the steps of (1) heating the tube to a temperature of at least 150° C., (2) applying to the outside back portion of said tube a layer having a thickness from about 5 to 30 mils of an adhesive copolymer of ethylene and from about 2 to about 20 percent by weight of an ethylenically unsaturated carboxylic acid having from 3 to 8 carbon atoms, (3) heating the coated tube to a temperature of at least 150° C., and (4) cooling the coated tube.

2. The process according to claim 1 wherein the ethylenically unsaturated carboxylic acid is acrylic acid.

3. An article of manufacture which comprises a television picture tube having an external glass surface and intimately adhered to the back out side surface thereof a layer having a thickness from about 5 mils to 30 mils of a copolymer comprising ethylene and from about 2 to about 20 percent by weight of an ethylenically unsaturated carboxylic acid having from 3 to 8 carbon atoms, said layer being capable of retaining in place glass fragments of the tube resulting from implosion.

4. The article according to claim 3 wherein the ethylenically unsaturated carboxylic acid is acrylic acid.

5. The article according to claim 3 wherein the layer of the copolymer is substantially free from fibrous material.

References Cited
UNITED STATES PATENTS

| | | |
|---|---|---|
| 2,293,529 | 8/1942 | Bedford. |
| 3,382,999 | 5/1968 | Powell et al. |

DAVID KLEIN, Primary Examiner

U.S. Cl. X.R.

117—124; 220—2.1